United States Patent
Hausler et al.

(10) Patent No.: US 9,403,476 B2
(45) Date of Patent: Aug. 2, 2016

(54) INFINITELY ADJUSTABLE CARGO LAMP FOR PICKUP TRUCKS

(71) Applicant: FORD GLOBAL TECHNOLOGIES, LLC, Dearborn, MI (US)

(72) Inventors: Henry W. Hausler, Manchester, MI (US); Paul Elia, West Bloomfield, MI (US); David A. Brown, West Bloomfield, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/282,272

(22) Filed: May 20, 2014

(65) Prior Publication Data

US 2015/0336503 A1 Nov. 26, 2015

(51) Int. Cl.
*B60Q 1/00* (2006.01)
*B60Q 1/30* (2006.01)
*B60Q 1/44* (2006.01)
*F21V 14/02* (2006.01)

(52) U.S. Cl.
CPC *B60Q 1/302* (2013.01); *B60Q 1/44* (2013.01); *F21V 14/02* (2013.01)

(58) Field of Classification Search
CPC .............. B60Q 1/22; B60Q 1/24; B60Q 1/06; B60Q 1/00; B60Q 1/26; B60Q 1/045; B60Q 1/0458; B60Q 1/2611; B60Q 1/0483; B60Q 1/2607; B60Q 1/302
See application file for complete search history.

(56) References Cited

U.S. PATENT DOCUMENTS

| | | | | |
|---|---|---|---|---|
| 3,679,890 A | * | 7/1972 | Pool | 362/275 |
| 4,692,845 A | * | 9/1987 | Widhalm et al. | 362/485 |
| 4,800,471 A | * | 1/1989 | Lippert | 362/485 |
| 4,891,625 A | * | 1/1990 | VanRiper et al. | 340/479 |
| 5,258,893 A | * | 11/1993 | Finneyfrock | 362/485 |
| 5,450,296 A | * | 9/1995 | McHugh | 362/525 |
| 6,379,028 B1 | * | 4/2002 | Crouse et al. | 362/485 |
| 7,073,930 B2 | | 7/2006 | Tiesler et al. | |
| 7,220,029 B2 | | 5/2007 | Bynum et al. | |
| 7,249,875 B1 | * | 7/2007 | Roach | B60Q 1/0005 362/369 |
| 7,290,905 B2 | * | 11/2007 | Tiesler | 362/488 |
| 7,303,320 B1 | * | 12/2007 | Ashley | 362/493 |
| 7,347,597 B2 | * | 3/2008 | French | B60D 1/60 280/164.1 |
| 7,819,566 B2 | * | 10/2010 | Kolstee et al. | 362/540 |
| 8,047,691 B2 | | 11/2011 | Leese et al. | |

FOREIGN PATENT DOCUMENTS

EP     2045131 A2     8/2009

* cited by examiner

*Primary Examiner* — Evan Dzierzynski
(74) *Attorney, Agent, or Firm* — Jason Rogers; King & Schickli, PLLC

(57) ABSTRACT

A cargo lamp is provided for a pickup truck. The cargo lamp includes a lamp housing, a stop light held in the lamp housing and an adjustable lamp held in the lamp housing. The adjustable lamp may be manipulated by the operator to selectively direct the light passing through the lamp to a target area of the pickup truck including a cargo bed of the truck.

15 Claims, 6 Drawing Sheets

INFINITELY ADJUSTABLE CARGO LAMP FOR PICKUP TRUCKS

TECHNICAL FIELD

This document relates generally to vehicles and more particularly to an infinitely adjustable cargo lamp for a pickup truck.

BACKGROUND

It is known in the art to equip a pickup truck with a cargo lamp mounted near the top of the cab above the rear window. Such a cargo lamp is useful for lighting the bed of a pickup truck to allow an operator to better see in low ambient light conditions. U.S. Pat. No. 8,047,691 to Leese et al. assigned to Ford Global Technologies, LLC, discloses such a cargo lamp.

While cargo lamps of this type are a very useful and convenient feature for a pickup truck operator, their utility is limited somewhat as they only allow for general lighting of the truck bed area. This document relates to an improved cargo lamp with infinite adjustability in order to allow the operator to focus the lighting on a particular target area. Better lighting at a point of interest aids a user in working more efficiently and effectively and is an important convenience feature.

SUMMARY

In accordance with the purposes and benefits described herein, an improved cargo lamp is provided for a pickup truck. The cargo lamp may be generally described as comprising a lamp housing, a stop light held in the lamp housing and an adjustable lamp held in the lamp housing whereby light from the adjustable lamp may be selectively directed to light a target area of the pickup truck. In one embodiment the adjustable lamp includes a light source and an adjustable frog eye assembly for directing light from the light source onto the target area. In one embodiment the frog eye assembly includes a main body and a lens held in the main body. Further the main body includes a parabolic inner surface.

A face covers the lamp housing. The face includes a mounting socket for receiving and holding the frog eye assembly. The frog eye assembly further includes a retainer that engages the face and captures the main body in that socket. In one embodiment the mounting socket includes a rear flange and the frog eye assembly includes a seal that is positioned between the main body and the rear flange. In one embodiment the front face comprises a clear lens over the adjustable lamp. In one embodiment the front face comprises a red lens over the stop light.

In one embodiment the cargo lamp includes a second adjustable lamp. The second adjustable lamp includes a second light source and a second adjustable frog eye assembly for directing light from the second light source onto a second target area. In one embodiment the stop light is positioned in the cargo lamp between the first and second adjustable lamps.

In accordance with an additional aspect, a pickup truck is disclosed incorporating a cargo lamp. That pickup truck comprises a cab and a cargo bed. Further the pickup truck includes an adjustable lamp mounted to the cab overlying the cargo bed whereby light from the adjustable lamp may be selectively directed to light a target area of the cargo bed.

In the following description, there is shown and described a preferred embodiment of the cargo lamp for a pickup truck. As it should be realized, the cargo lamp is capable of other different embodiments and the several details are capable of modification in various, obvious aspects all without departing from the cargo lamp as set forth and described in the following claims. Accordingly, the drawings and descriptions should be regarded as illustrative in nature and not as restrictive.

BRIEF DESCRIPTION OF THE DRAWINGS

The accompanying drawings incorporated herein and forming a part of the specification, illustrate several aspects of the cargo lamp, and together with the description serve to explain certain principles thereof. In the drawings:

FIG. 5a is a detailed face view of the cargo lamp showing the frog eye assemblies in a centered position while

Reference will now be made in detail to the present preferred embodiments of the cargo lamp, examples of which are illustrated in the accompanying drawings.

DETAILED DESCRIPTION

Figure 1:
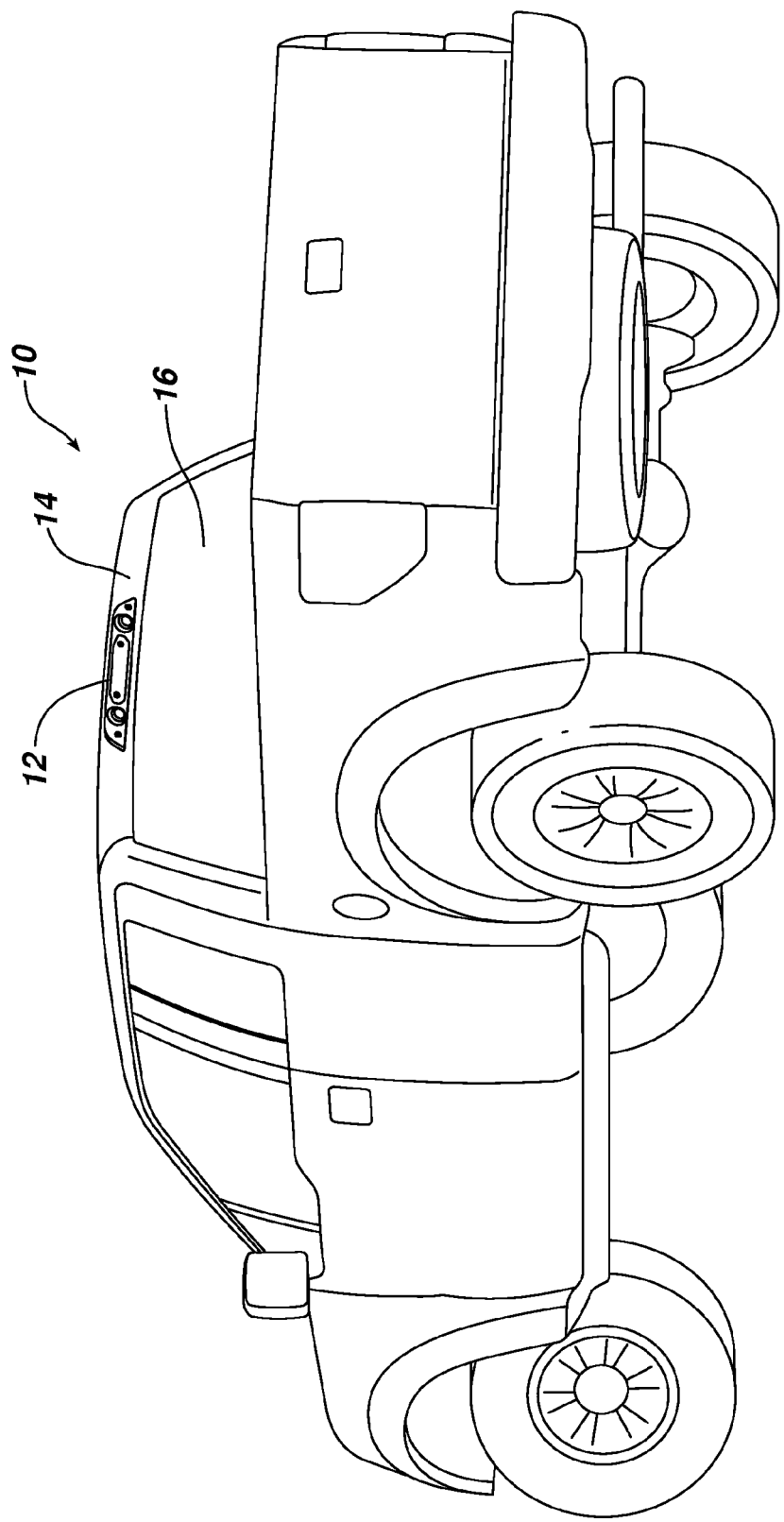
FIG. 1 is a rear quarter panel perspective view of a pickup truck incorporating one embodiment of the cargo lamp.
Figure 2:
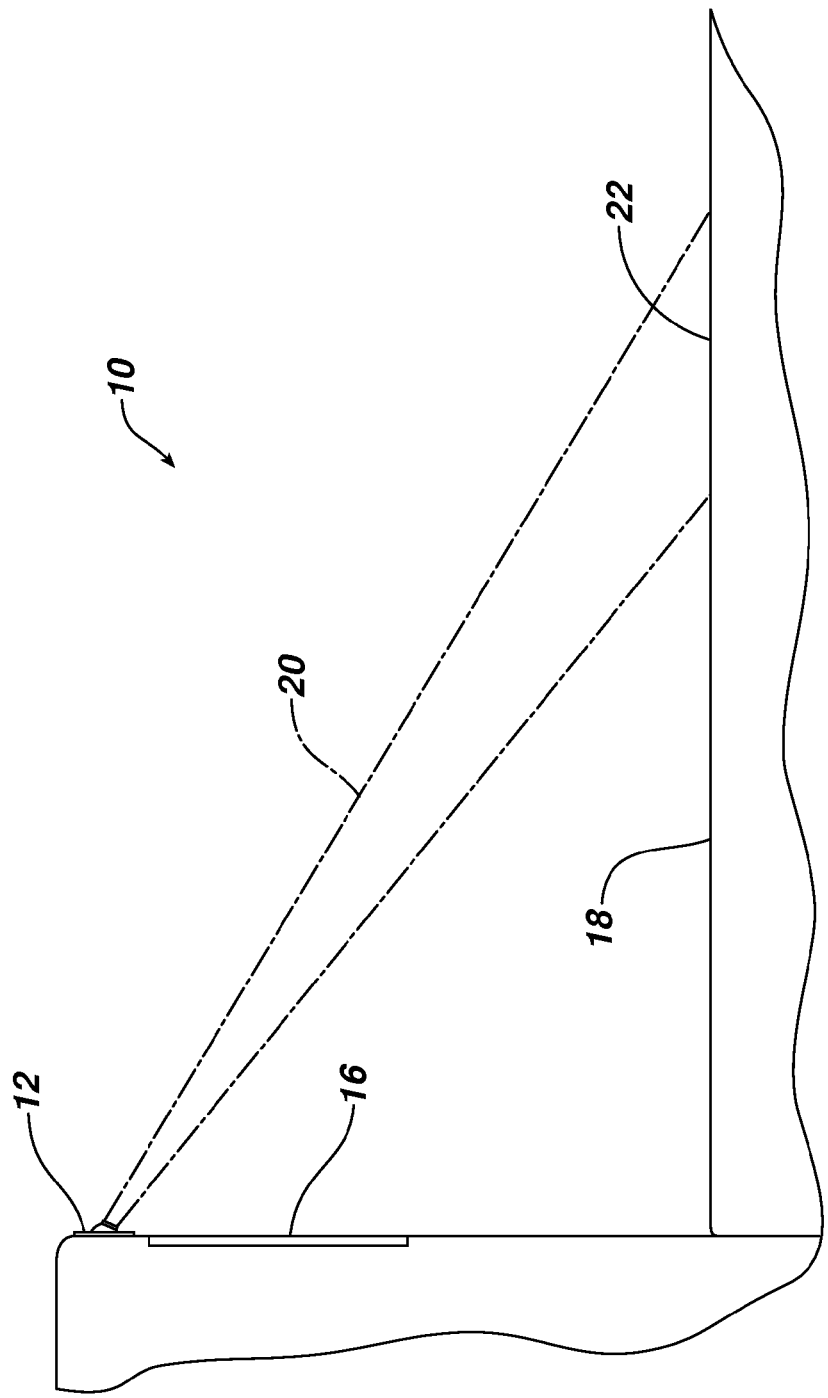
FIG. 2 is a schematical side elevational view showing how light from the cargo lamp may be adjusted and focused upon a target area in the cargo bed of the vehicle.

Reference is now made to FIGS. 1 and 2 illustrating a pickup truck 10 equipped with an infinitely adjustable cargo lamp 12. As illustrated, the cargo lamp 12 is mounted to the rear face of the cab 14 above the rear window 16. As illustrated in FIG. 2, in this position the cargo lamp 12 may be operated to direct a beam of light 20 onto a desired target area 22 within the bed 18 of the pickup truck 10.

Figure 3:
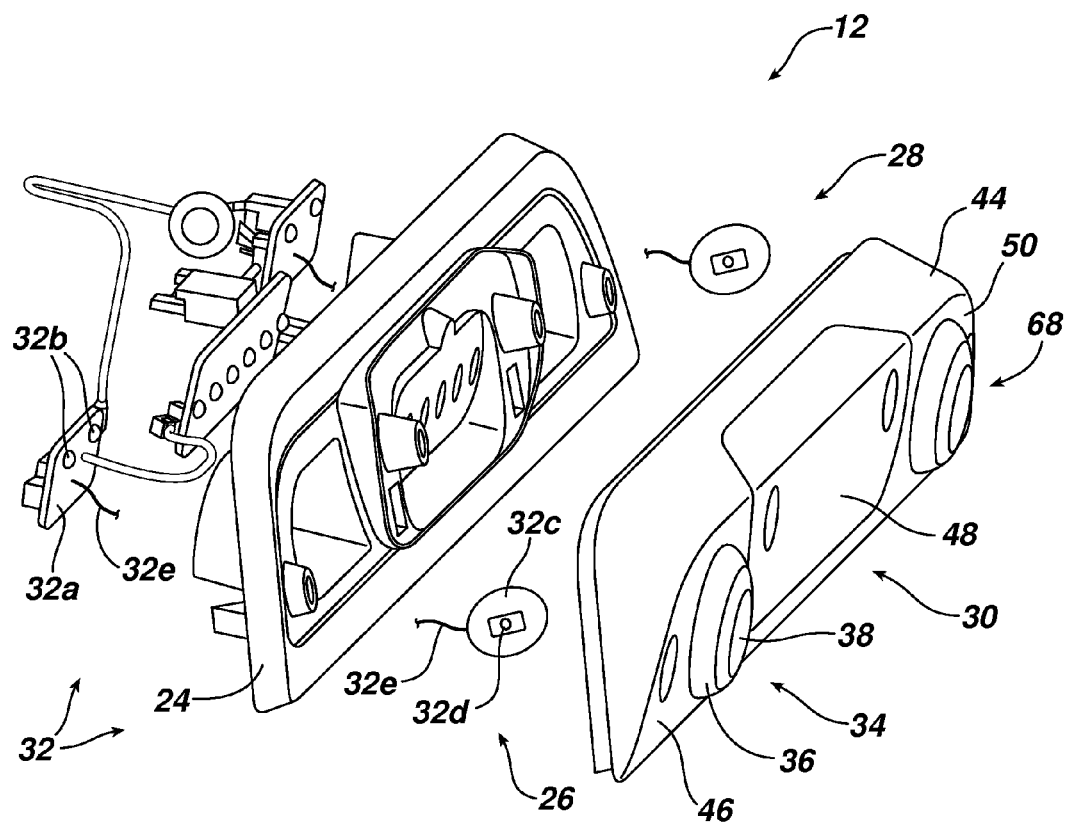
FIG. 3 is a partially exploded perspective view of the cargo lamp.
Figure 4:
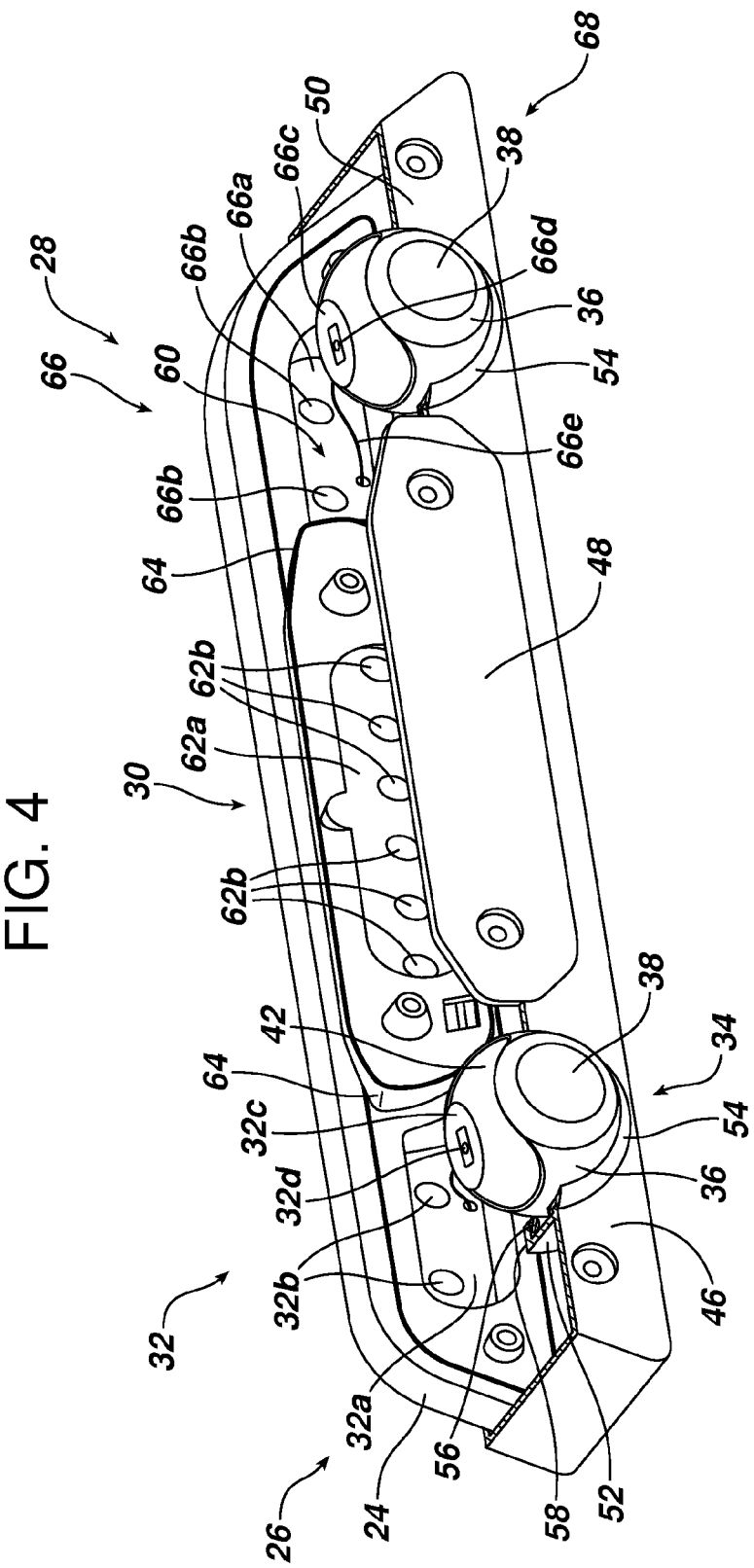
FIG. 4 is a cross-sectional view of the assembled cargo lamp illustrated in FIG. 3 showing the details of the frog eye assembly.
Figure 5A:
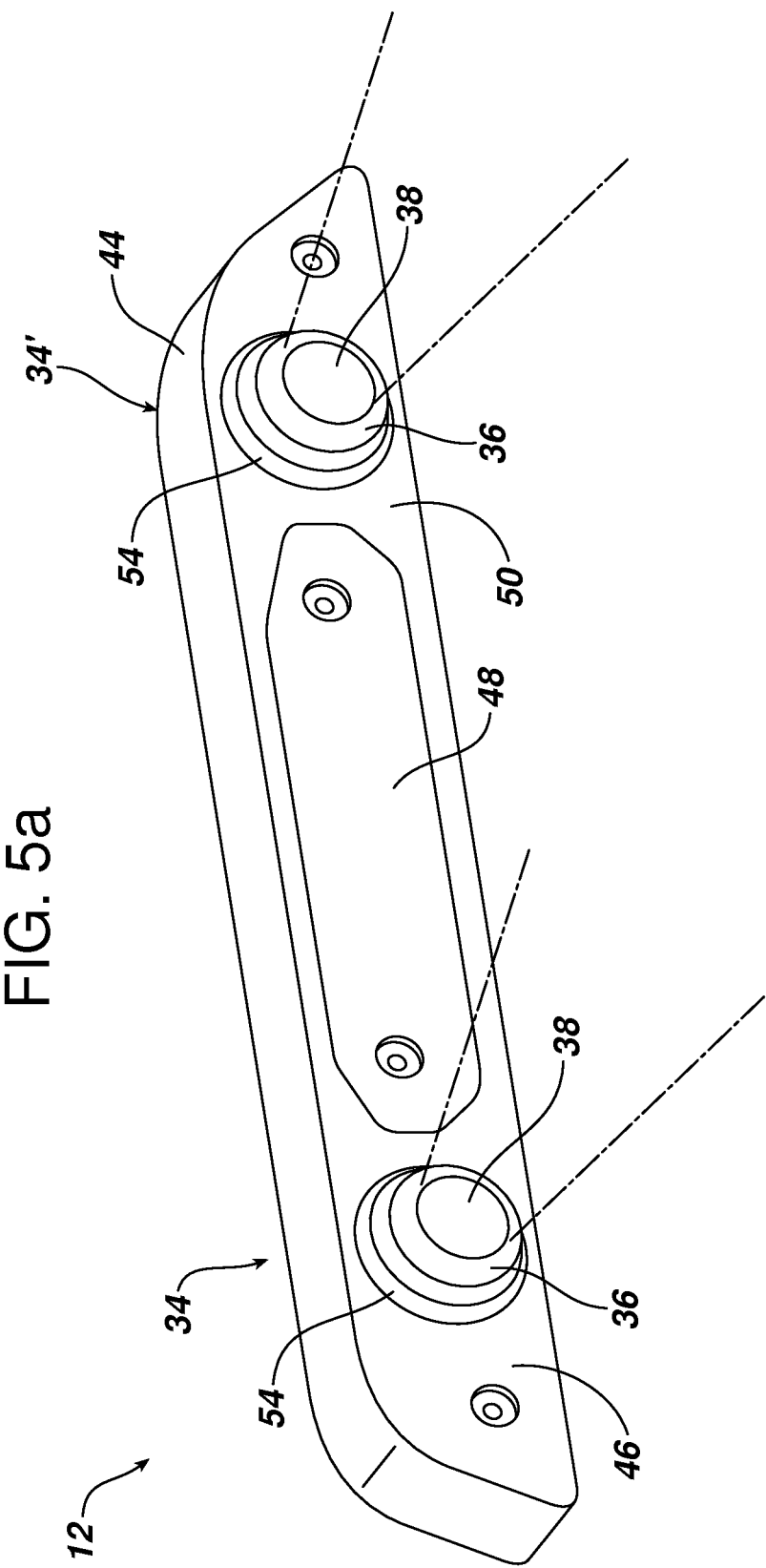
Figure 5B:
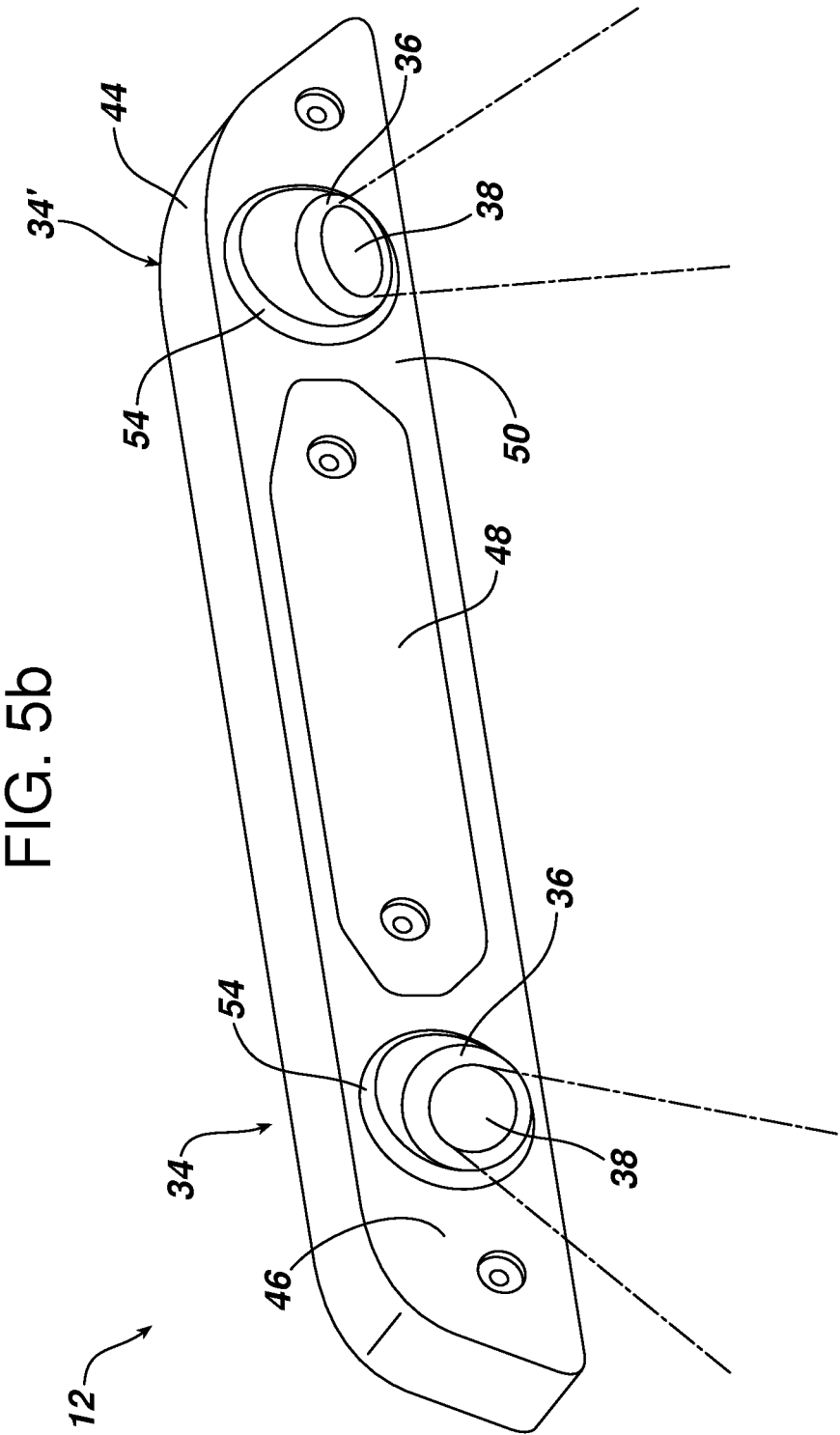
FIG. 5b shows how they may be individually adjusted to the side and/or down.

Reference is now made to FIGS. 3-5 which illustrate the construction and features of the cargo lamp 12 in detail. As illustrated, the cargo lamp 12 includes a lamp housing 24 that holds a first adjustable lamp 26, a second adjustable lamp 28 and a stop light 30 positioned between the first and second adjustable lamps.

As best illustrated in FIGS. 3-5a and 5b, the cargo lamp 12 also includes a face 44 that covers the lamp housing 24. In the illustrated embodiment, the face 44 includes a clear lens 46 over the first adjustable lamp 26, a red lens 48 over the stop light 30 and a clear lens 50 over the second adjustable lamp 28.

As illustrated in FIGS. 3 and 4, the first adjustable lamp 26 includes a light source 32 and an adjustable frog eye assembly, generally designated by reference numeral 34, for directing light from the light source onto the target area 22. As should be appreciated, the light source 32 may comprise any light source suitable for the intended purpose including, but not necessarily limited to, one or more incandescent lamps, one or more light emitting diodes (LEDs), a light rope or other lighting structure. In the illustrated embodiment, the light source 32 comprises a primary PC board 32a with associated LEDs 32b to provide general cargo lighting and a secondary PC board 32c with LED 32d to provide infinitely adjustable directional lighting through the adjustable frog eye assembly 34. Note the pig tail wiring 32e providing an electrical connection between the secondary PC board 32c and the primary PC board 32a.

The frog eye assembly 34 includes a main body 36 and a lens 38 held in the main body. The main body 36 holds the secondary PC board 32c and LED 32d associated therewith opposite the lens 38. The parabolic inner surface 42 of the main body 36 tends to collect and direct all light from the LED 32d through the lens 38.

As best illustrated in FIG. 4, the face 44 includes a mounting socket 52 for receiving and holding the frog eye assembly 34. The frog eye assembly 34 further includes a retainer ring 54 and a seal ring 56.

More specifically, the mounting socket 52 includes a rear flange 58. The frog eye assembly 34 is mounted in the mounting socket 52 by first positioning the seal ring 56 against the rear flange 58 and then inserting the main body 36 (including lens 38, PC board 32c and LED 32d) into the socket 52. The main body 36 is then secured in the socket 52 by means of the resilient retainer ring 54 which provides a snap friction fit with the face 44 of the cargo lamp 12. When properly assembled, the main body 36 may be infinitely adjusted to an angle of up to 30-35 degrees from the horizontal or central position for a full 360 degrees around (see FIGS. 5a and 5b). More specifically, an operator simply engages the portion of the main body 36 projecting from the face 44 and manipulates the main body to any desired position to direct the light coming through the lens 38 onto a desired target area 22. Here it should be appreciated that the rear of the main body 36 remains in engagement with the seal ring 56 at all times to seal the internal compartment 60 of the cargo lamp 12 from moisture intrusion. Further, the engagement with the resilient seal ring 56 provides enough frictional resistance to hold the main body 36 in any position in which the operator chooses to set the main body. Of course, the retainer ring 54 ensures that the main body 36 remains in its desired assembled position in the socket 52 at all times.

The second adjustable lamp 28 includes a structure identical to that described and shown above for the first adjustable lamp 26. Note the second light source 66 including primary PC board 66a with associated LEDs 66b to provide general cargo lighting through lens 49 and secondary PC board 66c with LED 66d to provide infinitely adjustable directional lighting through frog eye assembly 68. Also note pigtail wiring 66e connecting the two PC boards 66a and 66c. The only difference is the first adjustable lamp 26 is on one side of the stop light 30 while the second adjustable lamp 28 is on the other side.

The stop light 30 includes a stop light, including a PC board 62a with associated LEDs 62b, that is energized when an operator applies the brakes of the pickup truck 10. The light from the LEDs 62b is directed through the red lens 48 of the face 44 closing the lamp housing 24. The wall 64 of the lamp housing 24 compartmentalizes the light produced by the various light sources so that light from the LEDs 32b is strictly directed through the clear lens 46, the light from the stop light LEDs 62b is directed solely through the red lens 48 and the light from the LEDs 66b of the second adjustable lamp 28 is solely directed through the clear lens 50.

The cargo lamp 12 provides a number of unique benefits and advantages. The cargo lamp 12 provides the operator with a useful and convenient feature, allowing him to direct light onto a target area 22 to allow more effective work in low light ambient conditions. The infinite variability of the adjustable lamps 26, 28 allows the light to be directed virtually anywhere required on and above the bed 18 of the pickup truck 10. Further, this benefit and advantage is achieved in a compact and aesthetically pleasing design.

The foregoing has been presented for purposes of illustration and description. It is not intended to be exhaustive or to limit the embodiments to the precise form disclosed. Obvious modifications and variations are possible in light of the above teachings. All such modifications and variations are within the scope of the appended claims when interpreted in accordance with the breadth to which they are fairly, legally and equitably entitled.

What is claimed is:

1. A cargo lamp for a pickup truck, comprising:
   a lamp housing;
   a stop light held in said lamp housing;
   a face covering said lamp housing, said face including a first mounting socket and a second mounting socket;
   a first adjustable lamp held in said first mounting socket whereby light from said first adjustable lamp may be selectively directed to light a first target area of said pickup truck; and
   a second adjustable lamp held in said second mounting socket whereby light from said second adjustable lamp may be selectively directed to light a second target area of said pickup truck.

2. The cargo lamp of claim 1, wherein each of said adjustable lamps includes a light source and an adjustable frog eye assembly for directing light from said light source onto said target area.

3. The cargo lamp of claim 2, wherein each of said frog eye assemblies includes a main body and a lens held in said main body.

4. The cargo lamp of claim 3, wherein each of said main bodies includes a parabolic inner surface.

5. The cargo lamp of claim 4, wherein each of said frog eye assemblies further includes a retainer that engages said face and captures said main body in said mounting socket.

6. The cargo lamp of claim 5, wherein each of said mounting sockets includes a rear flange and each of said frog eye assemblies includes a seal between said main body and said rear flange.

7. The cargo lamp of claim 6, wherein said face comprises a clear lens over each of said adjustable lamps.

8. The cargo lamp of claim 1, wherein said stop light is positioned in said cargo lamp between said first adjustable lamp and said second adjustable lamp in a horizontal co-planar relationship.

9. The cargo lamp of claim 8, wherein said face comprises a red lens over said stop light.

10. A pickup truck incorporating said cargo lamp of claim 1.

11. A pickup truck, comprising;
   a cab and a cargo bed;
   a first adjustable lamp mounted to an exterior of said cab overlying said cargo bed whereby light from said first adjustable lamp may be selectively directed to light a first target area of said cargo bed, wherein said first adjustable lamp includes a first light source and a first adjustable frog eye assembly for directing light from said first light source onto said first target area;
   a second adjustable lamp mounted to the exterior of said cab overlying said cargo bed whereby light from said second adjustable lamp may be selectively directed to light a second target area of said cargo bed, wherein said second adjustable lamp includes a second light source and a second adjustable frog eye assembly for directing light from said second light source onto said second target area; and
   a stop light positioned between the first and second adjustable lamps such that said stop light and said first and second adjustable lamps are horizontally aligned.

12. The pickup truck of claim 11, wherein each of said frog eye assemblies includes a main body and a lens held in said main body.

13. The pickup truck of claim 12, wherein each of said main bodies includes a parabolic inner surface.

14. The pickup truck of claim 13, further including a face including a first mounting socket for receiving and holding said first frog eye assembly and a second mounting socket for receiving and holding said second frog eye assembly.

15. The pickup truck of claim 14, wherein each of said frog eye assemblies further includes a retainer that engages said face and captures said main body in said socket and a seal for sealing around said main body.

\* \* \* \* \*